United States Patent
Gehner et al.

(10) Patent No.: US 6,675,641 B2
(45) Date of Patent: Jan. 13, 2004

(54) CLOSED SYSTEM TRANSIENT DIESEL FUEL CONDITIONING AND MEASUREMENT SYSTEM

(75) Inventors: Gerrick S. Gehner, Peoria, IL (US); Kevin S. Maki, Peoria, IL (US); Timothy B. Kustka, Lakeville, MN (US); Daniel D. Wiest, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 224 days.

(21) Appl. No.: 09/886,897

(22) Filed: Jun. 21, 2001

(65) Prior Publication Data

US 2002/0194902 A1 Dec. 26, 2002

(51) Int. Cl.[7] .............................................. G01M 19/00
(52) U.S. Cl. .................................................... 73/118.1
(58) Field of Search ............................... 73/118.1, 113, 73/119 A, 114, 118.2

(56) References Cited

U.S. PATENT DOCUMENTS

| | | | |
|---|---|---|---|
| 2,201,019 A | | 5/1940 | Zotter |
| 2,215,469 A | * | 9/1940 | Janssen ........................ 123/516 |
| 3,423,998 A | | 1/1969 | Blomgren, Jr. |
| 3,680,371 A | | 8/1972 | Marcio et al. |
| 3,973,536 A | | 8/1976 | Zelders |
| 4,098,113 A | | 7/1978 | Erwin, Jr. |
| 4,134,301 A | | 1/1979 | Erwin, Jr. |
| 4,404,847 A | | 9/1983 | Larson |
| 4,411,239 A | | 10/1983 | Kelch |
| 4,450,820 A | | 5/1984 | Haynes |
| 4,479,465 A | | 10/1984 | Flynn |
| 4,612,804 A | | 9/1986 | Colonnello |
| 5,006,994 A | | 4/1991 | Andersson et al. |
| 5,205,160 A | | 4/1993 | Gandini |
| 5,213,086 A | | 5/1993 | Sims |
| 5,445,018 A | | 8/1995 | Harpster |
| 5,584,279 A | | 12/1996 | Brunnhofer |

* cited by examiner

Primary Examiner—Edward Lefkowitz
Assistant Examiner—Maurice Stevens
(74) Attorney, Agent, or Firm—Marshall, Gerstein & Borun (57) ABSTRACT

A fuel conditioning and measuring system for testing diesel engines includes a fuel conditioning loop having first and second heat exchangers, one employing a heating medium, and one employing a cooling medium. Flow of the heating and cooling mediums to the heat exchangers is controlled by control valves which receive a signal indicative of the temperature of the fuel flowing through the system and compare the measured temperature to a desired temperature to generate a control signal for positioning the control valves appropriately. A mixing tank serves as a buffer between the fuel supply and the test engine to ensure any disturbances from fuel returning from the test engine do not adversely affect the testing of the engine, and provides a mechanism by which the temperature of the fuel can be more accurately controlled. A flow meter and a density meter measure the flow of fuel through the system to provide accurate indications of mass and volumetric flow.

20 Claims, 5 Drawing Sheets

CLOSED SYSTEM TRANSIENT DIESEL FUEL CONDITIONING AND MEASUREMENT SYSTEM

TECHNICAL FIELD

The invention generally relates to closed loop fluid flow circuits and, more particularly, relates to closed loop fluid flow circuits for testing diesel engines.

BACKGROUND ART

In the testing of engines, it is typically necessary to measure the flow of fuel to the engine, as well as monitor and maintain the temperature of the fuel to the engine. Proper measurement and temperature fluctuation minimization result in more reliable test data. More specifically, the measurements regarding the flow of fuel can be used for, among other things, ascertaining the efficiency with which the engine runs, while the temperature of the operating fuel provides useful indications as to the potential pollutants being released by the engine and therefore assuring compliance with environmental regulations.

Better compliance can be achieved both by better process control and, ultimately, by better understanding of the engine product. That is, production and development margins can be tightened simply because the inputs affecting power growth are more tightly controlled. Proof that compliance is achieved under both steady-state and transient conditions can also be conclusively documented at regulatory agency specified conditions.

Previously, there was a coupling of cycle power and fueling rates. By fixing the input conditions to the engine throughout the cycle, emission sensitivity to intentional engine design changes become more apparent instead of being masked by this coupling.

In addition, for a fixed volumetric fuel delivery, cooler engines generally operate with more efficiency and more power such that control of the fuel to and from the engine can have a sizable effect on the power with which the engine operates.

Systems have therefore been developed which both measure the flow of fuel consumed by a test engine, and condition the fuel flowing to the engine. For example, Larson, U.S. Pat. No. 4,404,847, discloses a fuel supply conditioning and flow measurement circuit for testing fuel injectors wherein a fuel supply is drawn upon and communicated through a fluid flow circuit to the fuel injectors. A flow meter is provided in line with a fluid flow circuit, and a refrigeration device is provided to cool the fuel. However, a mechanism for separating return fuel flow is not provided, nor is a mechanism for heating the fuel flow if needed.

Haynes, U.S. Pat. No. 4,450,820, also discloses an engine fuel conditioner and monitor. Haynes discloses a conditioning tank intermediate the fuel supply and the engine. Fuel is drawn from the conditioning tank by the engine, with excess fuel being recycled back to the conditioning tank. A flow meter is provided intermediate the fuel tank and the conditioning tank and a single heat exchanger is disclosed to be disposable either in the conditioning tank, or in the fuel tank. However, first and second heat exchangers separate from the conditioning tank are not disclosed, nor is a mechanism for taking into account the density of incoming fuel.

The present invention is directed to overcoming one or more of the problems as set forth above.

DISCLOSURE OF THE INVENTION

In one aspect of the present invention, a fuel measuring and conditioning system is disclosed which comprises a consumed fuel measurement system and a fuel conditioning control loop.

In another aspect of the present invention, a fuel measuring and conditioning system is disclosed which comprises a mixing tank, a consumed fuel measurement system and a fuel conditioning control loop. The mixing tank includes an outlet adapted to supply fuel to an engine and an inlet adapted to receive fuel from the engine. The fuel measurement system includes a flow meter, while the fuel conditioning control loop includes first and second heat exchangers, and a circulation pump. The fuel measurement system includes an inlet adapted to receive a supply of fuel from a facility storage tank and an outlet in fluid communication with the fuel conditioning control loop. The fuel conditioning control loop includes an inlet connected to the mixing tank and an outlet connected to the mixing tank.

In another aspect of the present invention, a method of measuring and conditioning fuel for an engine is provided which comprises the steps of communicating fuel to the fuel conditioning control loop, measuring the flow of fuel flowing into the fuel conditioning control loop, pumping fuel from the mixing tank to the first and second heat exchangers and back to the mixing tank, measuring the temperature of the fuel within the mixing tank, recycling fuel from the mixing tank to the engine and back to the engine while measuring return fuel flow with a secondary flow meter [used for control purposes only; feed forward control], and controlling the flow of cooling/heating media to the first and second heat exchangers based on the temperature of the fuel in the mixing tank.

In accordance with another aspect the present invention, a closed loop transient diesel fuel conditioning and measurement system is provided which comprises a mixing tank, an engine supply/return loop, a fuel conditioning loop, a first heat exchanger, a second heat exchanger, a fuel inlet conduit, a flow meter, and a density meter. The mixing tank includes first and second inlets and first and second outlets. The first inlet and first outlet are adapted to be connected to a diesel engine. The fuel conditioning loop is connected to the mixing tank second inlet and second outlet. The first heat exchanger is interposed in the fuel conditioning loop and includes a heating medium. The second heat exchanger is also interposed in the fuel conditioning loop, but includes a cooling medium. The fuel inlet conduit includes an inlet and an outlet with the outlet being connected between the mixing tank second outlet and the fuel conditioning control loop and the inlet being adapted to be connected to a source of fuel. The flow meter and density meter are interposed in the fuel inlet conduit.

These and other aspects and features of the present invention will become more apparent from the following detailed description when taken in conjunction with the accompanying drawings.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

BEST MODE FOR CARRYING OUT THE INVENTION

Figure 1:
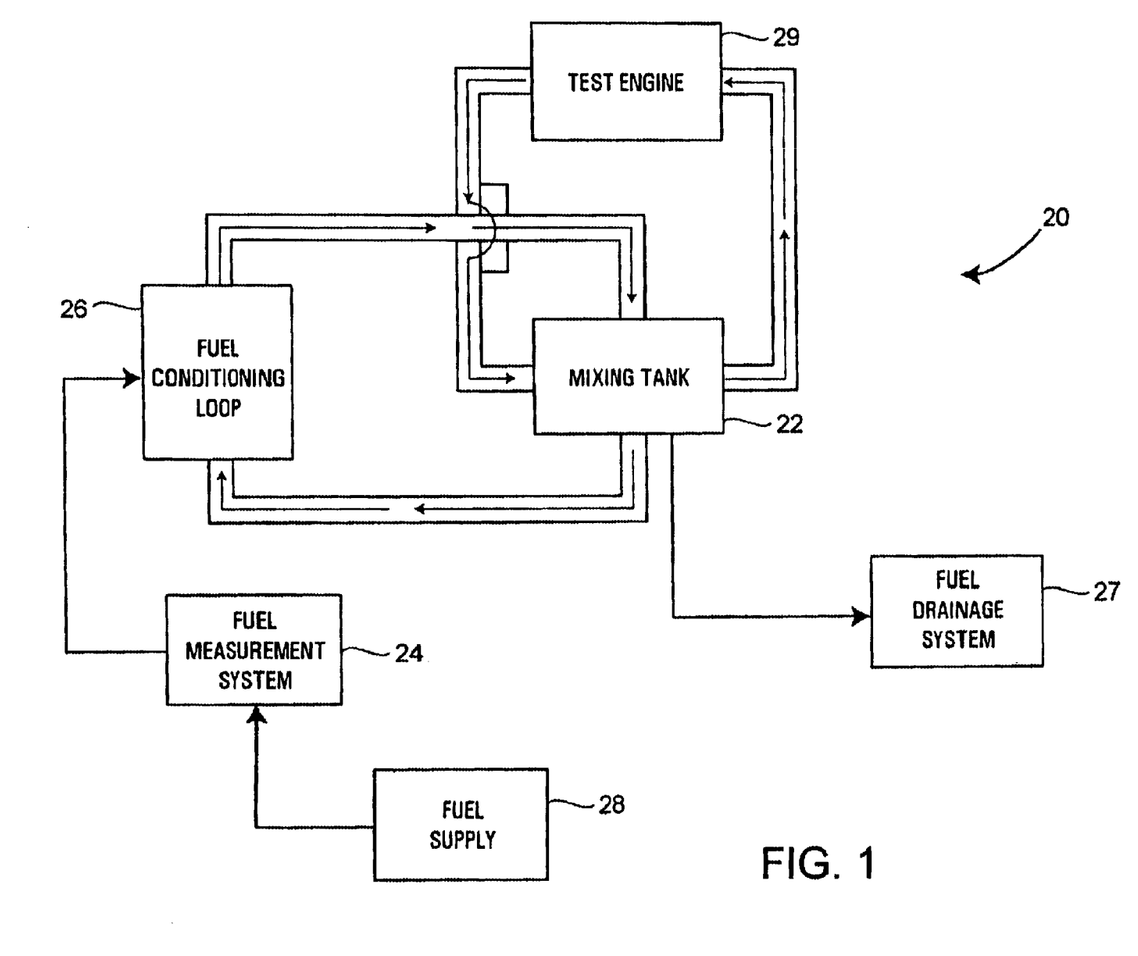
FIG. 1 is a block diagram of a fuel conditioning and measuring system constructed in accordance with the teachings of the invention.

Referring now to the drawings, and with specific reference to FIG. 1, a fuel conditioning and measuring system constructed in accordance with the teachings of the invention is generally referred to by reference numeral 20. Generally, the system 20 includes a mixing tank 22, a flow measurement system 24, a fuel conditioning loop 26, and a fuel drainage system 27. The system 20 is designed to supply temperature controlled and measured quantities of fuel from a supply 28 to a test engine 29. While the engine 29 may be a diesel engine and the supply 28 may be diesel fuel, it is to be understood that the teachings of the invention can be employed with other types of engines and fuels including, but not limited to, gasoline and other alternative liquid fuels.

Figure 2A:
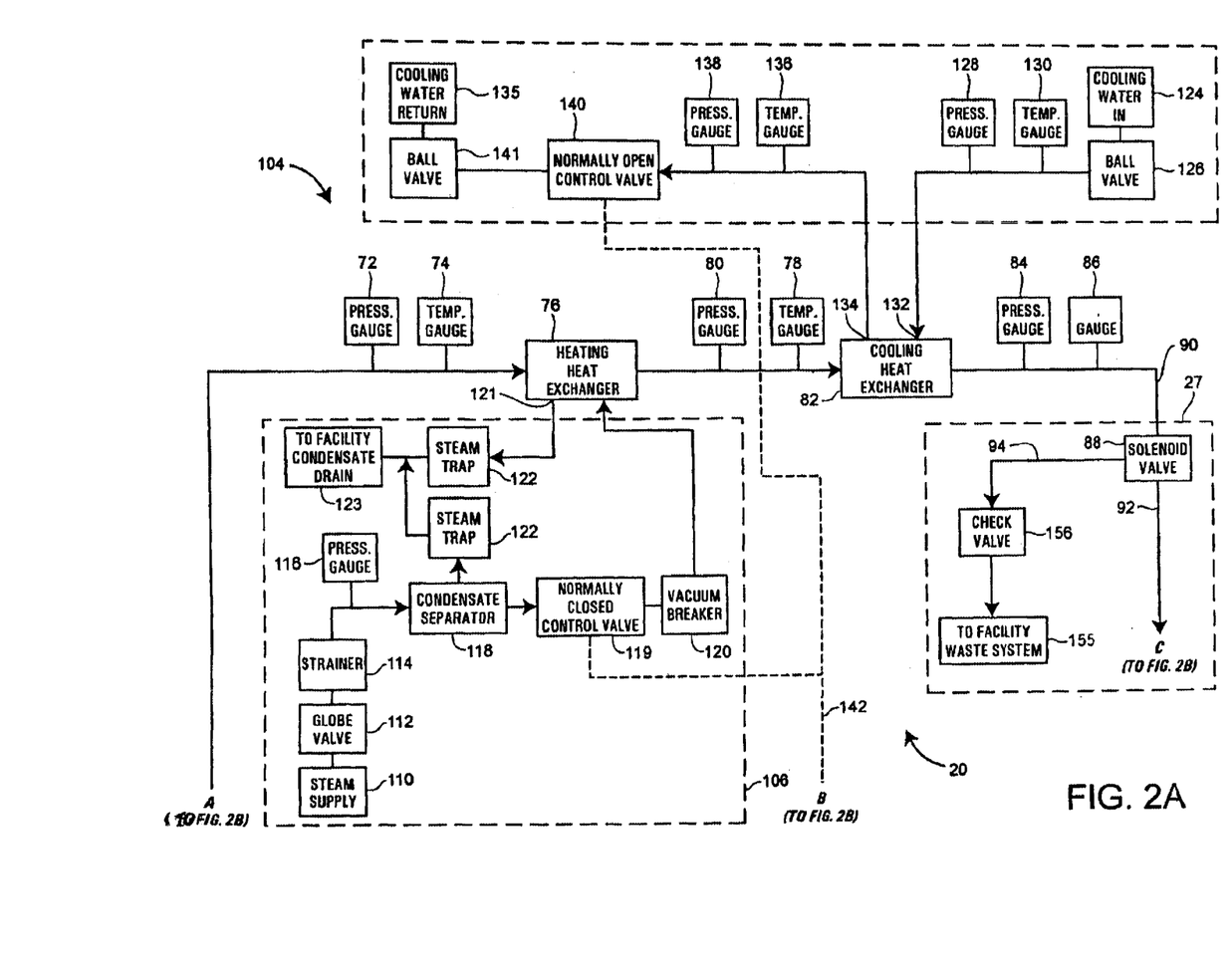
FIGS. 2A and 2B are block diagrams of a fuel conditioning and measuring system constructed in accordance with the teachings of the invention.
Figure 2B:
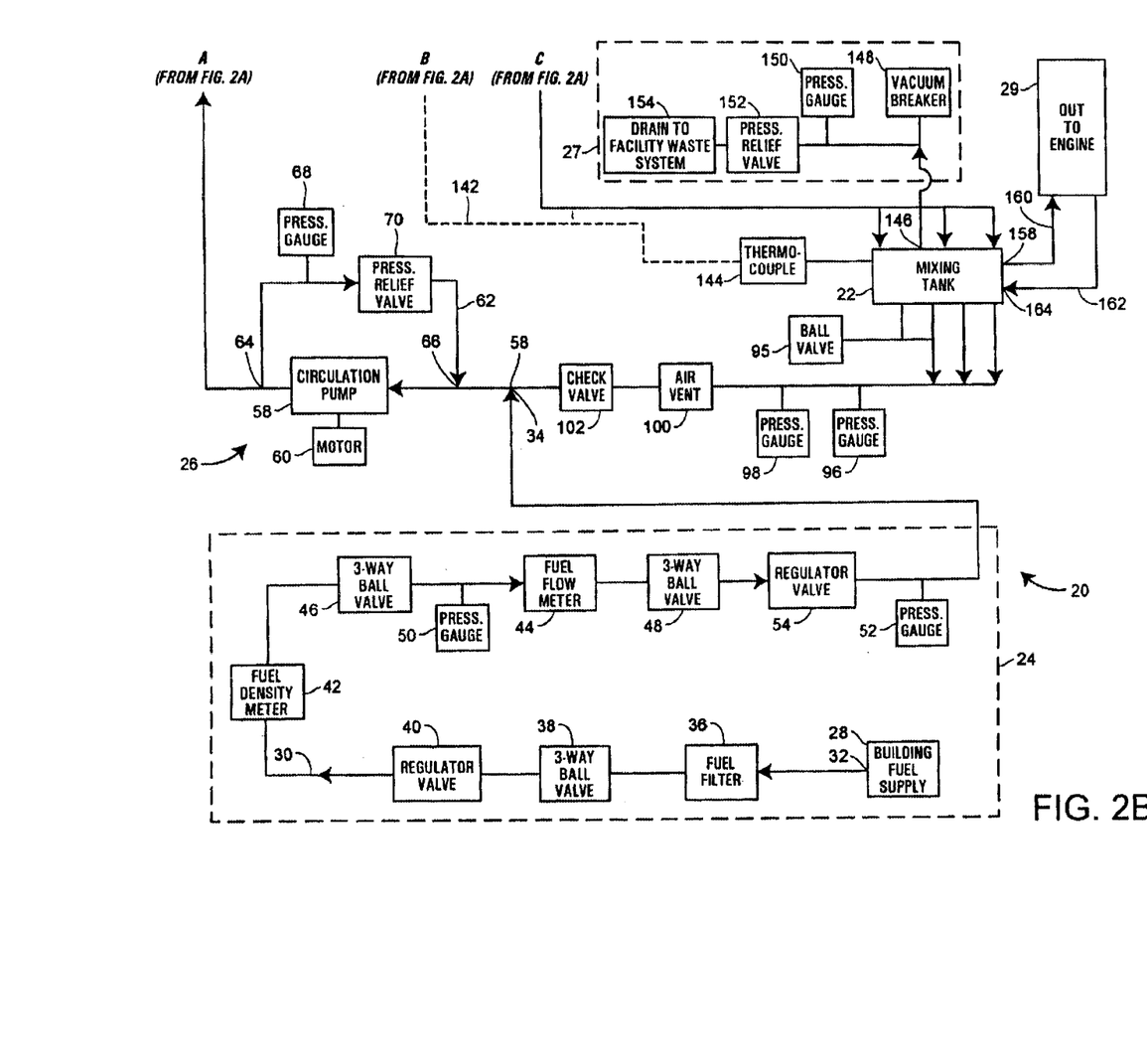

Referring now to FIGS. 2A and 2B, the fuel measuring system 24 is shown to include a fuel inlet conduit 30 having an inlet 32 and an outlet 34. The inlet 32 is adapted to be coupled to the fuel supply 28, as will be discussed in further detail herein. The outlet 34 is in fluid communication with the fuel conditioning loop 26.

The fuel measuring system 24 includes a fuel filter 36 downstream of the inlet 32, and a valve 38, which may be a ball valve, downstream of the fuel filter 36. A regulator valve 40 is positioned downstream of the valve 38 to eliminate bi-directional pressure fluxuations which may occur from the building fuel supply 28. As with conventional pressure regulator valves, the regulator valve 40 may include a spring sized to be compressed and thereby close the valve if the pressure within the fuel inlet conduit 30 rises above a predetermined level.

A density meter 42 is provided downstream of the regulator valve 40. The density meter 42 may be a density meter manufactured by Pierburg Industries, model number 53837. In addition to the density meter 42, a flow meter 44 is provided as part of the flow measuring system 24. The flow meter 44 may be flow meter manufactured by Pierburg Industries, model no. PLU126. The embodiment using a Pierburg meter (model no. PLU126) is preferred because of its ability to span the entire medium class of diesel engines (roughly 100 to 650 kw) and the fast meter response to changes in flow rate. Due to the range and flow measurement turndown of the meter, this meter provides the most cost-effective compromise for measuring idle to rated fueling rates. Should idle fueling rates become critical or smaller engines come under test, Pierburg flow meter model no. PLU103B extends the flow range for a cost premium. A density measurement is critical to the system to allow conversion from mass flow rate (for understanding combustion processes) to volume flow rate (for characterizing fuel system performance) in a fluid system with extreme thermal gradients and hence, expansions and contractions.

For smaller engines with lower fueling rates, the Micro Motion model no. cmf010 provides better instrumentation accuracy due to meter range and the integral density measurement provided by coriolis technology. For larger engines, the Micro Motion model no. cmf025 provides higher accuracy in non-idling flow measurements.

The fuel measuring system 24 is completed by second and third valves 46, 48, which may be ball valves, first and second pressure gauges 50, 52, and a second pressure relief or regulator valve 54. Second pressure relief valve 54 controls the fluid makeup to the fuel conditioning control loop, as well as the pressure in the mixing tank and fuel conditioning control loop. A purpose of regulator valve 54 is to simulate vehicular fuel tank conditions.

The outlet 34 of the fuel measuring system 24 is coupled to the fuel conditioning loop 26 at a juncture 56. Proceeding clockwise around the fuel conditioning loop 26 from juncture 56 and beginning with FIG. 2B, a pump 58 is shown as driven by a motor 60. A separate bypass loop 62 having an inlet 64 downstream of the pump 58, and an outlet 66 upstream of the pump 58 is provided. The bypass loop 62 also includes pressure gauge 68, and a pressure relief valve 70 to relieve excess pressure which may build up within the fuel conditioning loop 26.

Downstream of the bypass loop 62, as shown in FIG. 2A, a pressure gauge and temperature indicator 72 and 74, respectively, are provided. A first heat exchanger 76 is provided further downstream in the fuel conditioning loop 26. Downstream of the first heat exchanger 76 are another set of temperature indicators and pressure gauges 78 and 80, respectively, with a second heat exchanger 82 being provided further downstream in the fuel conditioning loop 26. Another pressure gauge 84 and temperature indicator 86 are provided downstream of the second heat exchanger 82 with a drainage valve 88 being provided downstream of the temperature indicator 86. The drainage valve 88 may be provided in the form of a three-way solenoid valve having an inlet 90 receiving fuel from the second heat exchanger 82, a first outlet 92 providing fuel to the mixing tank 22, and a second outlet 94 providing fuel to waste or another suitable receptacle, such as a facility waste system 155, when drainage of the system 20 is desirable. A check valve 156 may be provided to ensure one-way flow through the outlet 94.

Fuel exiting the drainage valve 88 from outlet 92 is directed to the mixing tank 22 as shown in FIG. 2B. While the operation of the mixing tank 22 will be described in further detail herein, for purposes of describing FIGS. 2A and 2B, it will be noted, specifically from FIG. 2B, that the fuel conditioning loop 26 further includes a ball valve 95, a temperature indicator 96 and pressure gauge 98 downstream of the mixing tank 22. In addition, a vent 100 is provided to facilitate operation of the drainage valve 88 and to remove any entrained air in the system, and a check valve 102 is provided to ensure flow of fuel around the fuel conditioning loop 26 in only one direction. The ball valve 95 controls fuel flow out of the mixing tank 22.

A subset of the fuel conditioning loop 26 is an advanced control loop 104, also shown in FIG. 2A. The advanced control loop 104 includes a first subloop 106 for use in conjunction with the first heat exchanger 76, as well as a second subloop 108 for use in conjunction with the second heat exchanger 82.

The first heat exchanger 76 is in fluid communication with a heating medium, such as steam, from a supply 110. The steam 110 is communicated via the first subloop 106 to a valve 112, a strainer 114, a pressure gauge 116, and a separator 118 before reaching a control valve 119. The valve 112 may be a globe valve, and the control valve 119 may be a normally closed control valve. Steam exiting the control valve 119 is communicated first to a vacuum breaker 120 and then to the heat exchanger 76 wherein the fuel to be heated is run through the heat exchanger proximate the heating medium to thereby raise the temperature of the fuel. The heat exchanger includes an outlet 121 which communicates the heating medium via a steam trap 122 to a facility condensate drain 123. The separator 118 may also be in communication with the steam trap 122.

Similarly, the second subloop 108 includes a supply of cooling medium, such as chilled water, from a supply 124. The second subloop 108 includes a valve 126, a pressure gauge 128, and a temperature indicator 130 before leading to an inlet 132 of the second heat exchanger 82. An outlet 134 allows the cooling medium to be communicated to a return 135, but the cooling medium first passes through a temperature gauge 136, a pressure gauge 138, and a control valve 140. A valve 141 may be provided intermediate the control valve 140 and the return 135. The valves 126 and 141 may be ball valves and the valve 140 may be a normally open control valve.

Both the first subloop 106 and the second subloop 108 receive a temperature signal 142 from a temperature sensor 144 mounted to the mixing tank 22. Depending upon the temperature signal 142, the control valves 119 and 140 adjust their positions accordingly. More specifically, the control valves 119, 140 include processing capability which enable a stored setpoint to be compared to the measured signal 142 for generation of an error signal. The error signal is then used to generate a control signal, which in turn is used to position the control valves and thereby control the flow through the control valves 119, 140.

FIGS. 2A and 2B also depict the fuel drainage system 27 for draining fuel from the mixing tank 22 and the fuel conditioning loop 26 when desired, such as when switching between grades or types of fuel being tested. As shown in FIG. 2B, the fuel drainage system 27 includes an inlet 146 connected to the mixing tank 22, a vacuum breaker 148, a pressure gauge 150 and a pressure relief valve 152. Downstream of the pressure relief valve 152 is an outlet 154 adapted to be communicated to a drain or other suitable receptacle for receipt of the fuel. As described earlier, the fuel drainage system 27 further includes, as shown in FIG. 2A, the drainage valve 88 and the vent 100 which allow fuel already in the system, and not drainable by a gravity through outlet 154, to be pumped from the system 20 via an outlet 155. A check valve 156 may be provided intermediate the valve 88 and the outlet 155.

Figure 3:
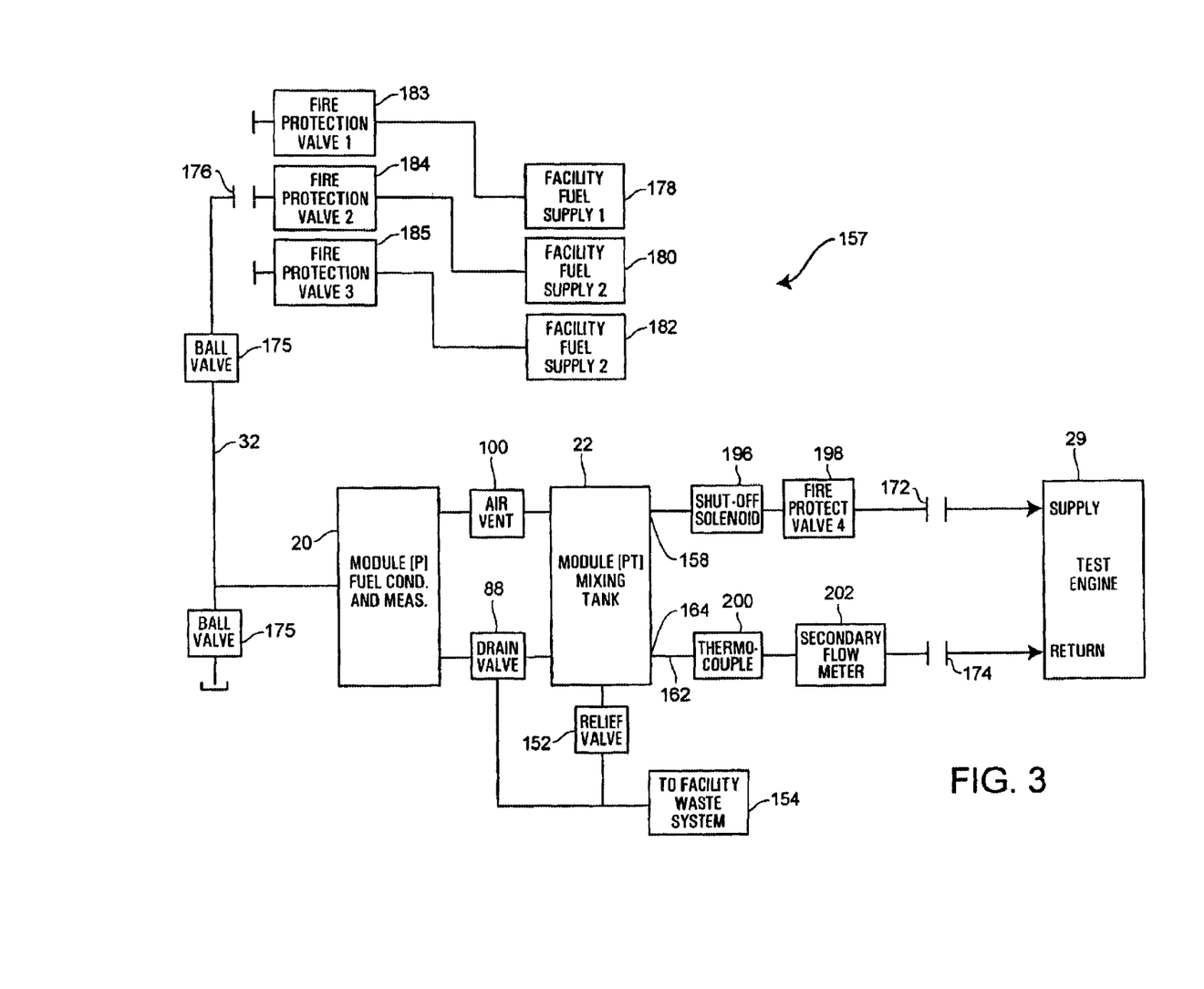
FIG. 3 is a block diagram of an engine testing system constructed in accordance with the teachings of the present invention.

Referring now to FIG. 3, an engine testing system 157 constructed in accordance with the teachings of the invention is shown. The fuel measuring and conditioning system 20 is included within the engine test system 157. In addition, the mixing tank 22 is depicted to include an outlet 158 connected to a supply conduit 160 providing fuel to the test engine 29. The mixing tank 22 also includes an inlet 164 receiving fuel from the test engine 29 via a return conduit 162.

Within the supply conduit 160 and the return conduit 162, are couplings 172, 174, respectively, to enable different test engines 162 to be connected to the system 20 for testing thereof. A shut-off solenoid valve 196 and a fire protection valve 198 are provided within the supply conduit 160, while a temperature sensor 200, such as a thermocouple, and a secondary flow meter 202 are provided within the return conduit 162.

FIG. 3 also depicts the inlet 32 of the flow measuring system 24 in further detail. Upstream of the inlet 32 are a plurality of ball valves 175 and a detachable coupling 176. The coupling 176 is adapted to be connected to a variety of fuel sources such as sources 178, 180, and 182 depicted in FIG. 3. Each of the fuel sources 178, 180, and 182 depicted in FIG. 3 could be a different type of fuel, such as a different octane, or an entirely different variety of fuel such as gasoline, diesel fuel, or other alternative liquid fuels. An emergency fire protection shut-off valve 183, 184, and 185 may be associated with each source, 178, 180, 182, respectively.

Figure 4:
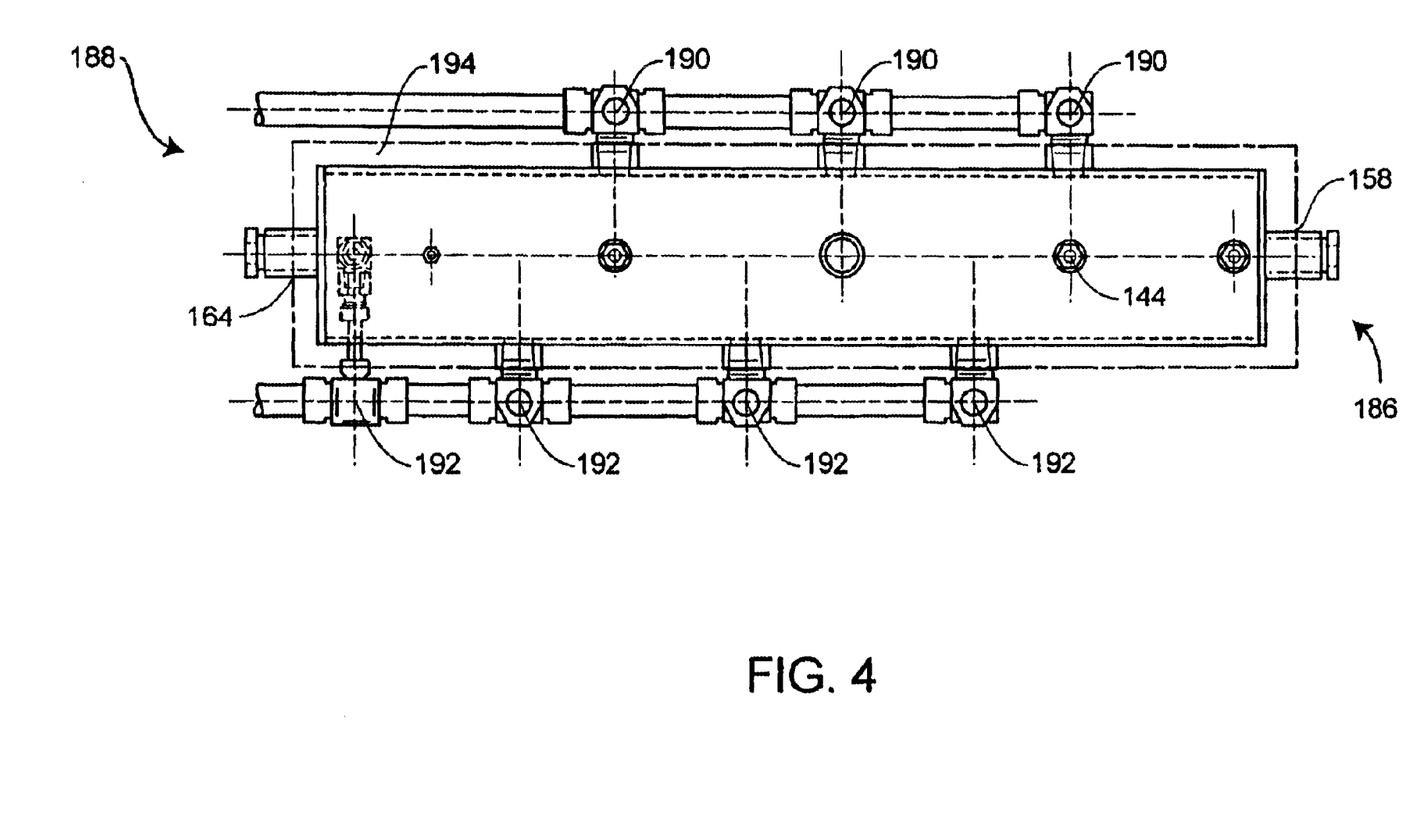
FIG. 4 is a top view of a mixing tank constructed in accordance with the teachings of the present invention.

Referring now to FIG. 4, mixing tank 22 is shown to include a cylindrical housing having a first end 186, and a second end 188. The fuel conditioning loop 26 includes a plurality of inlets 190 adapted to communicate fuel back to the mixing tank 22 and a plurality of outlets 192 adapted to draw fuel from the mixing tank 22 when the pump 58 is operational. The outlet 158 leading to the test engine is connected to the first end 186, while the fuel inlet 164 receiving fuel from the test engine 29 is provided in the second end 188. The temperature sensor 144 is also shown mounted to the mixing tank 22. A layer of insulation 194 may be provided around the mixing tank 22. Preferably as shown in FIG. 1, the fuel conditioning loop 26 and equipment communicating fuel to the fuel conditioning loop 26 and to and from the test engine 29 from the mixing tank 22 are insulated as well.

The mixing tank 22 is preferably large enough to provide conditioned fuel for the largest fuel consumption rate of the largest class of engine until the conditioned fuel is replenished via recirculation. A small tank is desired to minimize the inventory of fuel and hence, reduce the amount of thermal expansion possible within the entire fueling system. However, sizing a tank too small in relationship to the recirculation pump may result in warm, unconditioned return fuel from the engine being provided directly back to the input of the engine. That is, there is an optimal size for the tank.

The recirculation rate is preferably matched to the engine flow rate at least 5 to 1. That is, the fluid in the system should be recirculated 5 times before the same volume of fluid is returned from the engine. The high level of recirculation rate in relationship to return facilitates good mixing within the tank and ensures that fuel is replenished faster than it will be consumed from the tank. Specifically, the pump recirculation rate is determined by the largest return fuel rate of the largest class of engine.

A key function of the tank 22 is to provide a buffer between the engine 29 and the conditioning system 26. A large tank is desired to decrease the system sensitivity (i.e., increase the lag time) to rapid changes in return fuel rate and temperature. However, increasing the time constant of the sytem to disturbances negatively impacts the ability of the system to be used to measure instantaneous fuel rates due to thermal expansions and contractions within the volume of the system. Thus, the buffering desired is not stratification of temperatures but equilibration through rapid mixing. The tank size and geometry enhances the system response to rapid changes in engine return fuel rates and temperatures by increasing the overall time constant of the conditioning system thereby minimizing temperature excursions due to control system "hunting."

INDUSTRIAL APPLICABILITY

In operation, the fuel measuring and conditioning system 20 can be used to provide precisely temperature controlled fuel to the engine 29 for testing thereof. For example, the system 20 can be connected to a diesel engine to test its performance and, by providing a fuel of a substantially constant temperature, substantially eliminate any variables in test data associated with variations relative to uncertainty of the on-board engine fuel management system in fuel temperature. In addition, the system 20 provides accurate indications as to the cycle [for example, the cycle may be, but is not limited to, EPA on-highway transient cycle, 13 mode cycle, or EPA off-highway cycle] fuel consumption of the engine 29 being tested. The system 20 is particularly advantageous when testing engines 29 during transient, i.e., non-steady state, conditions.

The system 20 is able to do so by, among other things, employing the fuel conditioning loop 26. The fuel conditioning loop 26 draws fuel from the mixing tank 22 and exposes the drawn fuel to first and second heat exchangers 76, 82 connected in a closed loop, with feedback from the temperature sensor 144 mounted to the mixing tank 22. More specifically, depending upon the temperature sensed within the mixing tank 22, the control valves 119 and 140, controlling the flow of medium through the first and second heat exchangers 76 and 82, can be varied to either heat or cool the fuel returning to the mixing tank 22 and thereby maintain a relatively constant temperature for the fuel. Depending upon the setpoints established within the control valves 120 and 136, the temperature of the fuel within the mixing tank 22, and thus the temperature of the fuel communicated to the engine 29, can be tailored to the needs of the specific test being performed.

Not only do the first and second heat exchangers 76 and 82 enable the temperature of the fuel to be maintained at a substantially constant level, but the existence of the mixing tank 22 itself serves to further condition the fuel being provided to the engine 29. By providing the mixing tank 22, the fuel being communicated to the fuel conditioning control loop 26 is isolated from any flow disturbances which may result from fuel being recycled directly back from the test engine 29. In addition, any air which becomes entrained within the fuel can be vented or aerated from the supply being returned to the test engine 29. Furthermore, the measurement of density (as opposed to the common practice of density calculation based on a fluid temperature and know fluid property such as specific gravity) provides traceability of the fuel used in a given test and documentation of test to test variability for fuel properties. This adds value both to the ISO system of validation and to the performance analyst's ability to detect changes in inputs to the engine 29 that could influence engine emissions.

With regard to the flow measuring system 24, the combination of the flow meter 44 with the density meter 42 provides test data reflecting an accurate indication as to the consumption of fuel by the test engine 29. As opposed to only using the flow meter 44, which measures volumetric flow, the addition of the density meter 42 can further take into account the temperature of the entering fuel and thereby the mass flow of fuel to the engine 29.

Not only can the fuel measuring and conditioning system 20 be used to test multiple engines 29, but through the provision of the fuel draining system 27, the system 20, including the mixing tank 22, can be fully drained before coupling the inlet 32 to an alternate fuel source such as any of the fuel sources 178, 180, or 182.

The closed-loop control system 20 is characterized by system response to a measured input signal, by the relative stability of the system to resist changes from set-point, and the responsiveness of the system to correct for large deviations from set-point.

To this end, the control system 20 preferably employs, among other things, the use of and location of a thermocouple (as opposed to RTD) in the tank as a control point. Although, RTD's provide more accurate control of a setpoint, the thermal lag of the probe itself is significant and thermocouples provide the fastest indication of changes in temperature in the tank. Furthermore, the tank inlet is the closest point to the engine fuel supply and provides an ideal location for measurement in a well-mixed tank.

The system 20 also employs the use of insulation to minimize heat transfer from conditioned fuel lines supplying the tank 22 and ultimately, the engine 29. Due to the high rates of recirculation and the interface with cell ambient conditions set at roughly 15° C. below the fuel set-point, system stability and repeatability is established by isolating the fuel transfer lines from the ambient environment on the supply side while fully exposing the lines to enhance heat transfer on the engine return side.

The optimization of fuel system volume by minimizing system inventory permits the system to be responsive to disturbances while providing sufficient inventory to introduce a time lag between rapidly changing engine conditions and relatively slow control system corrections. This is important primarily because of limitations imposed by fixed heat exchanger surface areas, fixed response times of valves associated with variable conditioning fluid flow (e.g., heating/cooling), and fixed response of sensors used to query the process.

Other aspects, objects, and advantages of this invention can be obtained from a study of the drawings, the disclosure, and the appended claims.

What is claimed is:

1. A fuel measuring and conditioning system, comprising:
   a mixing tank including an outlet adapted to supply fuel to an engine and an inlet adapted to receive fuel from the engine;
   a fuel measurement system including a flow meter, the fuel measurement system including an inlet adapted to receive a supply of fuel and an outlet in fluid communication with the mixing tank; and
   a fuel conditioning control loop including first and second heat exchangers, the fuel conditioning control loop having an inlet connected to the mixing tank and an outlet connected to the mixing tank.

2. The fuel measuring and conditioning system of claim 1, wherein the fuel measurement system further includes a density meter.

3. The fuel measuring and conditioning system of claim 1, wherein the first heat exchanger is in fluid communication with a heating medium and the second heat exchanger is in fluid communication with a cooling medium.

4. The fuel measuring and conditioning system of claim 3, wherein the first and second heat exchangers include internal control loops, each control loop including a valve controlling the flow of a respective medium therethrough, the mixing tank including a temperature sensor sensing the temperature of fuel within the mixing tank and transmitting a signal proportional thereto to the valves controlling the first and second control loops.

5. The fuel measuring and conditioning system of claim 1, wherein the mixing tank includes an outlet adapted to allow the mixing tank to be drained.

6. The fuel measuring and conditioning system of claim 1, wherein the fuel measurement system inlet includes a disconnectable coupling adapted to be connected to multiple fuel sources.

7. The fuel measuring and conditioning system of claim 1, wherein the mixing tank is cylindrical with an engine inlet provided at a first end, and an outlet provided at a second end, and wherein a layer of insulation extends around the entire mixing tank.

8. The fuel measuring and conditioning system of claim 7, including a test engine, the engine inlet and outlet being connected to the test engine.

9. The fuel measuring and conditioning system of claim 8, wherein the test engine is run at transient conditions.

10. The fuel measuring and conditioning system of claim 8, wherein the test engine is a diesel engine.

11. The fuel measuring and conditioning system of claim 1, wherein the fuel measurement system includes a fuel filter.

12. A method of measuring and conditioning fuel for an engine, comprising the steps of:

communicating fuel to a mixing tank;

measuring the flow of fuel flowing into the mixing tank;

cycling fuel from the mixing tank to the engine and back to the engine;

measuring the temperature of the fuel within the mixing tank;

pumping fuel from the mixing tank through the first and second heat exchangers and back to the mixing tank; and controlling the flow of heating/cooling media to the first and second heat exchangers based on the temperature measuring step while maintaining a constant fuel circulation rate.

13. The method of claim 12, wherein the measuring flow step is performed using a flow meter.

14. The method of claim 13, wherein the measuring flow step is performed using a density meter.

15. The method of claim 12, wherein the measuring temperature step is performed using a thermocouple.

16. The method of claim 15, wherein the controlling step is performed using control valves in electrical communication with the thermocouple.

17. The method of claim 12, wherein the first heat exchanger employs a heating medium.

18. The method of claim 12, wherein the second heat exchanger employs a cooling medium.

19. The method of claim 12, wherein the engine is a diesel test engine, and including the step of operating the diesel test engine under transient conditions.

20. A closed loop transient fuel conditioning and measurement system, comprising:

a mixing tank including first and second inlets and first and second outlets, the first inlet and first outlet being adapted to be connected to a diesel engine;

a fuel conditioning loop connected to the mixing tank second inlet and second outlet;

a first heat exchanger interposed in the fuel conditioning loop, the first heat exchanger having a heating medium;

a second heat exchanger interposed in the fuel conditioning loop, the second heat exchanger having a cooling medium;

a fuel inlet conduit having an inlet and an outlet, the outlet being connected to the fuel conditioning loop, the inlet being adapted to be connected to a source of fuel;

a flow meter interposed in the fuel inlet conduit; and a density meter interposed in the fuel inlet conduit.

* * * * *